(12) United States Patent
Wong (10) Patent No.: US 8,997,072 B1
(45) Date of Patent: Mar. 31, 2015

(54) COMPRESSING DEPENDENCY GRAPHS IN A SOCIAL NETWORK

(75) Inventor: Henry Wong, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 397 days.

(21) Appl. No.: 13/593,406

(22) Filed: Aug. 23, 2012

Related U.S. Application Data (60) Provisional application No. 61/671,562, filed on Jul. 13, 2012.

(51) Int. Cl.
*G06F 9/45* (2006.01)

(52) U.S. Cl.
CPC ................................ *G06F 17/30877* (2013.01)
USPC .......................................... 717/157; 151/156

(58) Field of Classification Search
None
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,446,258 B1 * | 9/2002 | McKinsey et al. ............ | 717/161 |
| 6,697,478 B1 | 2/2004 | Meldrum et al. | |
| 6,754,322 B1 | 6/2004 | Bushnell | |
| 7,039,923 B2 * | 5/2006 | Kumar et al. ................. | 719/331 |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |

(Continued)

FOREIGN PATENT DOCUMENTS

WO         WO0279984         10/2002

OTHER PUBLICATIONS

Chao et al, "Minimizing Redundat Dependencies and Interprocessor Synchronizations", 1995, Plenum Publishing Corporation.*

(Continued)

*Primary Examiner* — Lewis A Bullock, Jr.
*Assistant Examiner* — Mark Gooray
(74) *Attorney, Agent, or Firm* — Patent Law Works LLP (57) ABSTRACT

This technology is directed to compressing dependency graphs in online communities, e.g., social networks, by determining a dependency graph and by performing a transitive reduction on the dependency graph. The transitive reduction may be used in various applications, e.g., for loading software modules in social networks, without causing inefficiencies by loading the same modules multiple times. In some instances, the systems and methods include 1) sorting nodes (e.g., modules) in the dependency graph into a list in a valid dependency order (a node depends only on nodes earlier in the list), 2) iterating over the list while building a map from any node to all of its dependencies, 3) iterating through the dependency graph in reverse order, and for each node, iterating through its dependencies (also in reverse order) and removing each dependency if it is a transitive dependency of any of the previous dependencies of that node.

18 Claims, 7 Drawing Sheets

(56) References Cited

U.S. PATENT DOCUMENTS

| | | |
|---|---|---|
| 2007/0173236 A1 | 7/2007 | Vishwanathan et al. |
| 2007/0248077 A1 | 10/2007 | Mahle, Jr. et al. |
| 2008/0056475 A1 | 3/2008 | Brannick et al. |
| 2008/0192656 A1 | 8/2008 | Vagelos |
| 2011/0098156 A1 | 4/2011 | Ng et al. |

OTHER PUBLICATIONS

Gries et al, "An Algorithm for Transitive Reduction of an Acyclic Graph", 1989, Elsevier Science Publishers B.V.*

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support" "Always on Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, May 13, 2011, 8 pgs.

Twitter Blog: Tracking Twitter, Internet, May 13, 2011, 2 pgs.

Twitter Announces Fire Hose Marketplace: Up to 10K Keyword Filters for 30 Cents, Internet, retrieved at, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

COMPRESSING DEPENDENCY GRAPHS IN A SOCIAL NETWORK

CROSS REFERENCE TO RELATED APPLICATIONS

The present application claims the benefit of priority under 35 U.S.C. §119(e) of U.S. Provisional Application No. 61/671,562 entitled "Compressing Dependency Graphs In A Social Network," filed on Jul. 13, 2012, by Henry Wong. The entire contents of the provisional application are incorporated by reference herein.

BACKGROUND

The present disclosure relates to compressing dependency graphs in online communities. In particular, the present disclosure relates to optimizing software by compressing dependency graphs, including software modules in social networks.

Software may typically be divided into many different modules. These modules are organized into dependency graphs describing the order in which particular modules may be executed (i.e., in the order of module dependency). Depending on a particular application, for example, a social network, extensive code is often necessary to launch and operate the particular application. In the instances where code bases are complex, the dependency graphs may be very large. For example, in some instances of a social network implementation, the dependency graph may be well over 11,000 modules (e.g., javascript). In many cases, especially where the code bases may be large and complex, dependency graphs may include many redundant dependencies. This results in unnecessary requests and operations to load the same modules multiple times.

As one example, a "first" module and a "second" module may be dependent on the same module, for example, a "third" module. To execute, a request to load the "first" module may be received first. Yet, because the "first" module is dependent on the "third" module, before loading the first module, the "third" module loads first, followed by the "first" module. After the "first" module loads, a request to load the "second" module may be received and as the "second" module is also dependent on the "third" module, the "third" module loads yet again. In this particular example, the "third" module is either loaded twice, or the software determines that the "third" module is already loaded. In either implementation, this process of either reloading a module already on the system, or simply determining that it is on the system, is cumbersome and inefficient, especially in cases where a dependency graph is very large and complex.

SUMMARY

According to one innovative aspect of the subject matter described in this disclosure, the systems disclosed include one or more computing devices configured to compress a dependency graph in a social network, by replacing the dependency graph with a transitive reduction. The systems further include a) a graph receiver module for receiving the dependency graph; b) a sorting module for sorting one or more nodes in the dependency graph into a valid dependency ordering; c) a dependency map module iterating through the one or more nodes, while creating a map from each of the one or more nodes to their one or more dependencies; and d) a dependency remover module for iterating through the one or more nodes in reverse order, and in response to a single dependency being a transitive dependency of any previous iterated dependencies, for removing the single dependency.

In general, another innovative aspect of the subject matter described in this disclosure may be embodied in methods that include a computer-implemented method for compressing a dependency graph in a social network, by replacing the dependency graph with a transitive reduction, including a) receiving, using the one or more computing devices, the dependency graph; b) sorting, using the one or more computing devices, one or more nodes in the dependency graph into a valid dependency ordering; c) iterating, using the one or more computing devices, through the one or more nodes, while creating a map from each of the one or more nodes to their one or more dependencies; d) iterating, using the one or more computing devices, through the one or more nodes, in reverse order; e) iterating, using the one or more computing devices, through the one or more dependencies, in reverse order; and f) in response to determining a single dependency that is a transitive dependency of any previous iterated dependencies, removing, using the one or more computing devices, the single dependency.

Other aspects include corresponding methods, systems, apparatus, and computer program products. These and other implementations may each optionally include one or more of the following features or operations. For instance, the features include that the one or more nodes include one or more software modules and a program execution module, which in response to loading dependencies of the one or more software modules, executes the one or more software modules. For instance, the operations may include loading the one or more software modules in response to loading dependencies of the one or more software modules. The systems and the methods may be hosted either entirely, or partially (in a distributed architecture), on one or more of social network servers, third party servers, and user devices.

The advantages of this technology are many, the most significant of which is that with the ongoing trends and popularity of module-based software (e.g., javascript), it is beneficial to generate more compact forms of dependency graphs, without sacrificing accuracy when implementing the module-based software.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In some implementations, this technology includes systems and methods for compressing dependency graphs relating to social networks. Specifically, this technology includes systems and methods for compressing dependency graphs (e.g., software modules) by replacing them with their transitive reduction. For example, software may include one or more modules (e.g., javascript modules) and the systems and methods determine redundancies in the dependency graph of software modules, eliminate the redundancies (by transitive reduction) and execute the software modules after removing the redundant dependencies. In some examples, this technology uses a computing device to compress a dependency graph in a social network by receiving the dependency graph, sorting one or more nodes of the dependency graph into a valid dependency ordering. The computing device iterates through the one or more nodes, while creating a map from each of the one or more nodes to their one or more dependencies. The computing device iterates through the one or more nodes, in reverse order; iterating through the one or more dependencies, in reverse order, and in response to determining a single dependency that is a transitive dependency of any previous iterated dependencies, the computing device removes, the single dependency.

Figure 1:
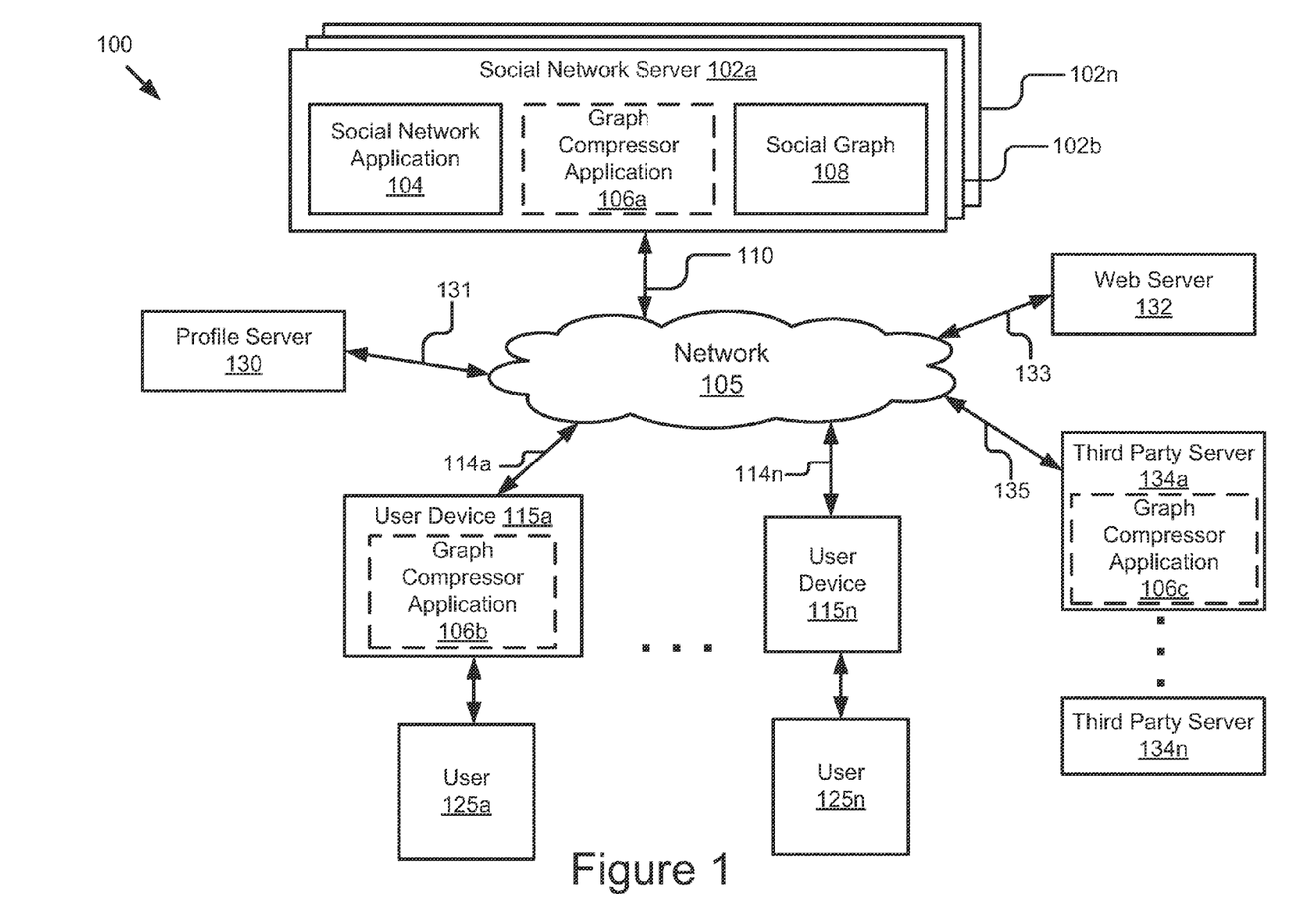
FIG. 1 is a high-level block diagram illustrating an example system for compressing dependency graphs including a graph compressor application.

FIG. 1 is a high-level block diagram illustrating some implementations of systems for compressing social dependency graphs. The system 100 illustrated in FIG. 1 provides example system architecture for compressing social dependency graphs. The system 100 includes one or more servers 102a, 102b, through 102n, that may be accessed via user devices 115a through 115n, which are used by users 125a through 125n, to connect to any one of the servers 102a, 102b, through 102n. These entities are communicatively coupled via a network 105.

Moreover, while the present disclosure is described below primarily in the context of compressing dependency graphs for simplifying software module dependencies in social networks, the present disclosure may be applicable to other situations where compressing dependency graphs for any purpose that is not related to software module dependencies, is necessary or desired. For ease of understanding and brevity, the description of the present disclosure is described in reference to compressing dependency graphs for simplifying software module dependencies in a social network.

The user devices 115a through 115n in FIG. 1 are illustrated by way of example. Although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, and the servers, 102a-102n, in practice, any number of networks 105 may be connected to these entities.

In some implementations, the server 102a is coupled to the network 105 via a signal line 110. Although only one server 102a is described here, multiple servers may be present, as illustrated by servers 102b through 102n, each with functionality similar to the server 102a, or different.

The server 102a includes a graph compressor application 106a, to which user devices 115a through 115n are coupled via the network 105. In particular, user devices 115a through 115n are coupled, via lines 114a through 114n, to the network 105. The user 125a interacts via the user device 115a with the social network server 102a, which uses the graph compressor application 106 to compress social dependency graphs. The graph compressor application 106 or certain components of it may be stored in a distributed architecture in any of the server 102 and the user device 115. In other implementations, the graph compressor application 106 may be included, either partially or entirely, in any one or more of the server 102 (a through n) and the user device 115 (a through n).

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations such as a star configuration, token ring configuration, or other configurations known to those skilled in the art. Furthermore, the network 105 may include a local area network (LAN), a wide area network (WAN, e.g., the Internet), and/or any other interconnected data path across which one or more devices may communicate.

In another implementation, the network 105 may be a peer-to-peer network. The network 105 may also be coupled to or include portions of one or more telecommunications networks for sending data in a variety of different communication protocols.

In yet another implementation, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some implementations, the servers 102a-102n are hardware servers including a processor, memory, and network communication capabilities. One or more of the users 125a through 125n access any of the servers 102a through 102n, via browsers in their user devices 115a through 115n.

Figure 2:
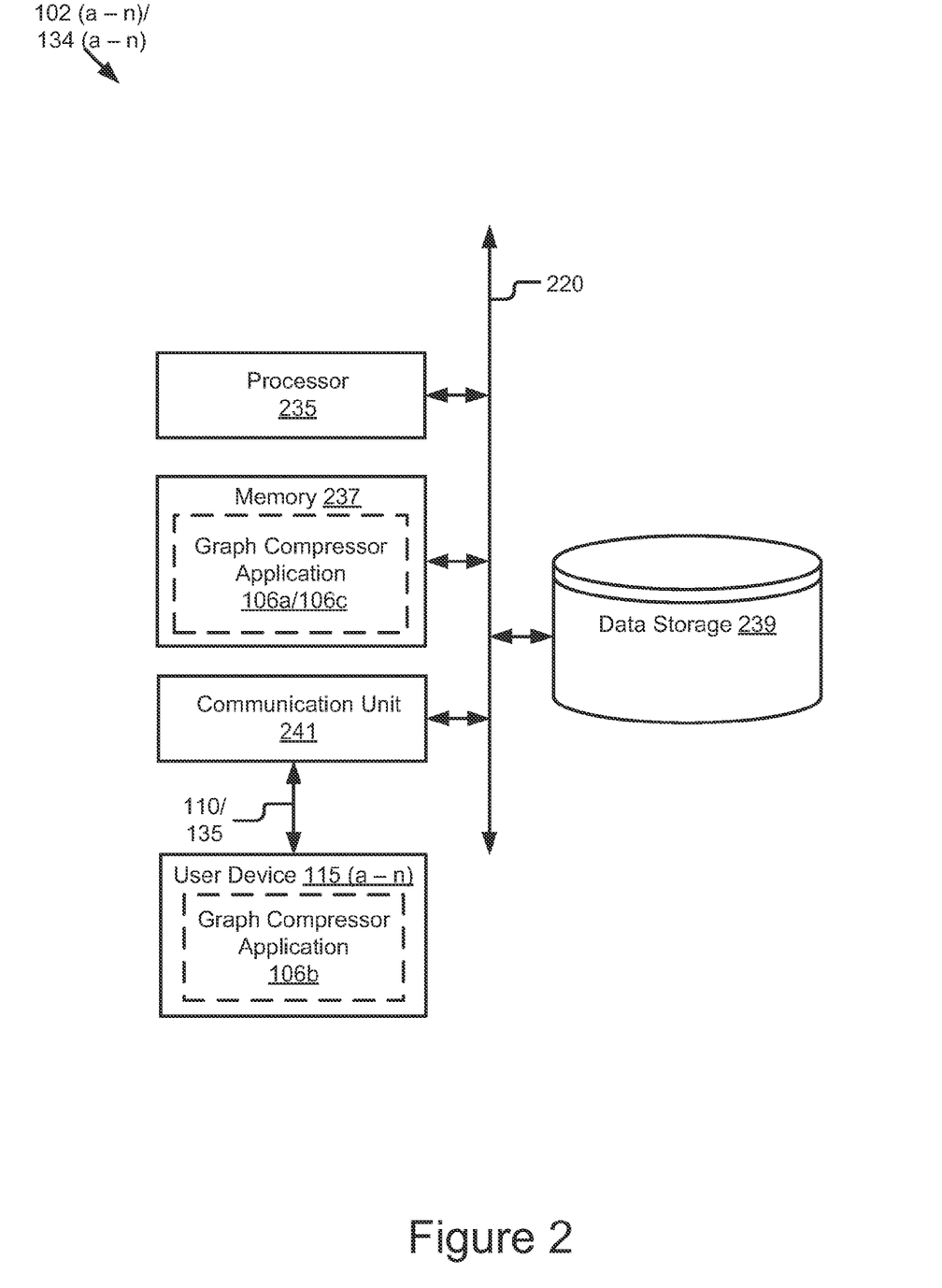
FIG. 2 is a block diagram illustrating example hardware components of the example system shown in FIG. 1.

FIG. 2 is a block diagram illustrating some implementations of a server 102a through 102n, wherein one or more of the servers 102 (a through n) include a graph compressor application 106a. In FIG. 2, like reference numerals have been used to reference like components with the same or similar functionality that has been described above with reference to FIG. 1. For those components that have been described above, that description is not repeated here. The server 102 (a through n) generally includes one or more processors, although only one processor 235 is illustrated in FIG. 2. The processor is coupled, via a bus 220, to memory 237 and data storage 239, which stores any information related to software modules, received from any of the other sources identified above. In some implementations, the data storage 239 is a database organized by one or more users. In some implementations, the graph compressor application 106a/106c is stored in the memory 237.

A user 125a, via a user device 115a, executes a software program including one or more software modules, via the communication unit 241. The graph compressor application 106 may reside, in its entirety or parts of it, in the user's device (115a through 115n), in the server 102a (through 102n), or alternatively, in a separate server. The user device 115a communicates with the social network server 102a (or 102b through 102n) or the third party server 134a (or 134n) using the communication unit 241, via signal line 110/135.

Figure 3:
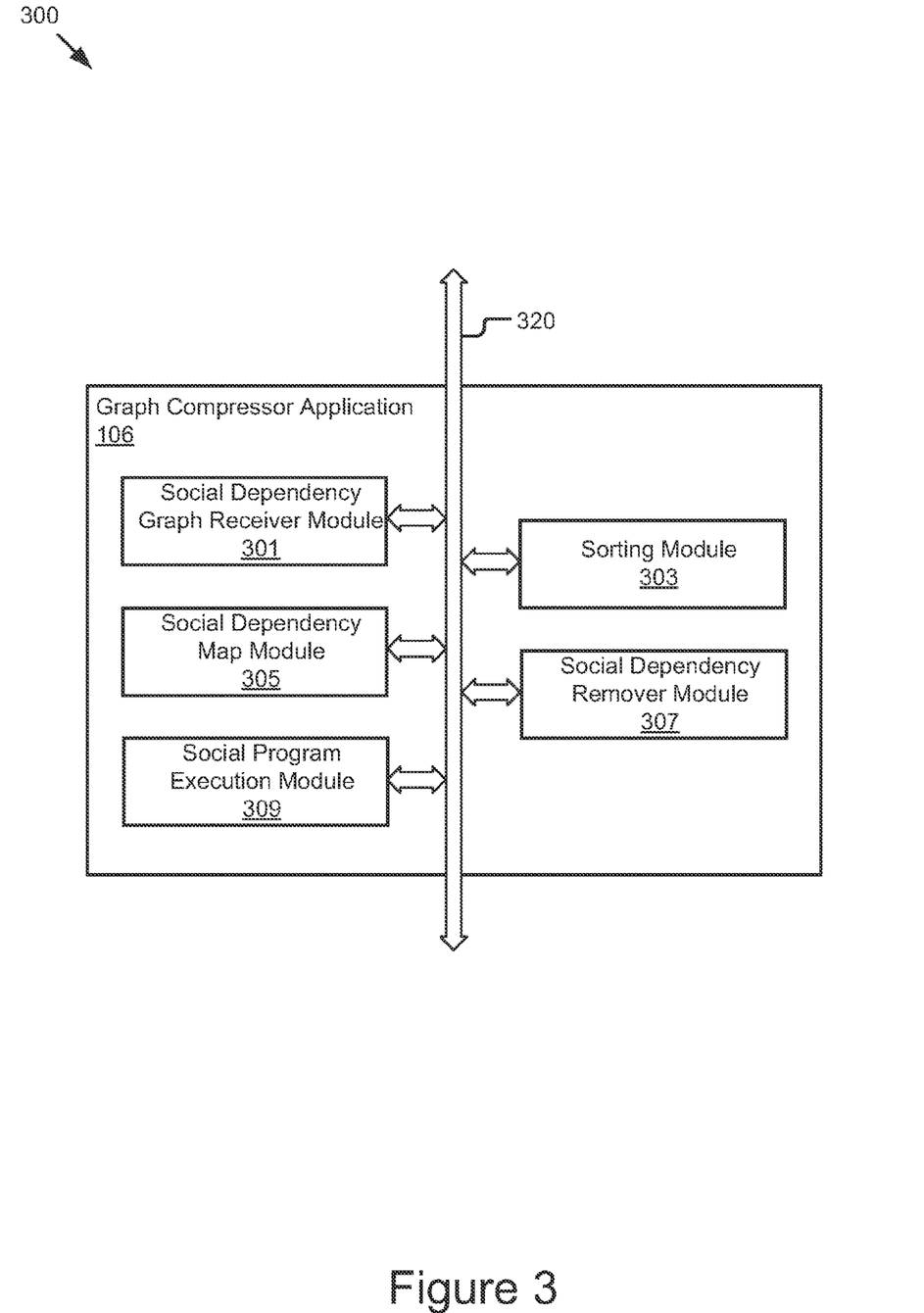
FIG. 3 is a block diagram illustrating an example graph compressor application and its software components.

Referring now to FIG. 3, like reference numerals have been used to reference like components with the same or similar functionality that has been described above with reference to FIGS. 1 and 2. For those components have been described above, that description is not repeated here. The social graph compressor application 106 (a, b, or c), indicated here by reference numeral 300, includes various applications or engines that are programmed to perform the functionalities described here. In some embodiments, the social dependency graph receiver module 301 receives a dependency graph from one or more systems. The sorting module 303 sorts the nodes in the dependency graph. The social dependency map module 305 generates a dependency map of all the dependencies for each of the nodes in the dependency graph. The social dependency remover module 307 removes those dependencies that are redundant from the dependency graph then generating a compressed version of the social dependency graph. The social program execution module 309 executes the one or more modules in the compressed social dependency graph with increased efficiency.

Each of the modules in the graph compressor application 106 (a through c) is software including routines for managing permissions. In some implementations, the modules social dependency graph receiver module 301, the sorting module 303, the social dependency map module 305, the social dependency remover module 307, and the social program execution module 309 can be a set of instructions executable by the processor 235 to provide the functionality described above with respect to each module implementation. In other implementations, the modules can be stored in the memory 237 of the social network 102 (a through n) or the third party server 134 (a through n), or the user device 115 (a through n) and can be accessible and executable by the processor 235. In either implementation, the modules can be adapted for cooperation and communication with the processor 235, the communication unit 245, data storage 221 and other components of the social network server (a-n), the third party server 134 (a-n), or the user device 115 (a-n), via the bus 220. The social graph compressor application 106 (a-c) includes applications or engines that communicate over the software communication mechanism 320. Software communication mechanism 320 may be an object bus (such as CORBA), direct socket communication (such as TCP/IP sockets) among software modules, remote procedure calls, UDP broadcasts and receipts, HTTP connections, function or procedure calls, etc. Further, any or all of the communication, could be secure (SSH, HTTPS, etc.). The software communication can be implemented on any underlying hardware, such as a network, the Internet, a bus 220 (FIG. 2), a combination thereof, etc.

The social dependency graph receiver module 301 may receive the dependency graph from one or more systems. In some implementations, the dependency graph may include one or more nodes, which have dependencies on any number of other nodes. In other implementations, the nodes may be modules (e.g., javascript). For example, various program frontends divide up their program code into modules (e.g., javascript). These modules may have dependencies on yet other modules. In order to load a given module, the module loading code must also load all of its dependencies, their dependencies, etc.

The sorting module 303 sorts the nodes in a particular dependency graph. The sorting module 303 sorts the nodes in the graph (e.g., javascript modules) into a list in a valid dependency ordering such that any node depends only on nodes that appear earlier in the list.

The social dependency map module 305 generates a dependency map of all the dependencies for each of the nodes. The social dependency map module 305 traverses over the list (in valid dependency order) building a map from every node to all of its dependencies.

The social dependency remover module 307 removes any redundant dependencies from the dependency graph. The social dependency remover module 307 iterates through the graph in reverse order. For each node, the social dependency remover module 307 iterates through its dependencies (also in reverse order) and removes a dependency if it is a transitive dependency of any of the previous dependencies of that node. A dependency as described here may refer to either a direct dependency (i.e., directly dependent on another node) or a transitive dependency (i.e., dependent on a node which is dependent another node).

The social program execution module 309 executes the one or more modules of the compressed dependency graph. In some implementations, after the social dependency remover module 307 removes all redundant dependencies, the social program execution module 309 executes the software including all the dependent modules.

Figure 4A:
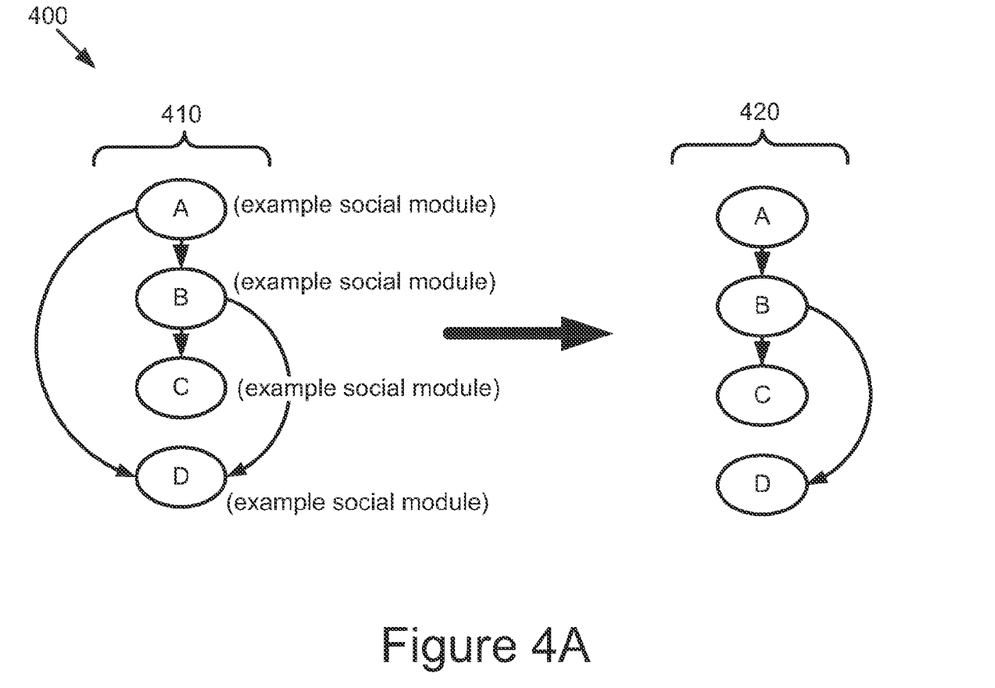
FIG. 4A is a graphical representation illustrating an example method for compressing a dependency graph.
Figure 4B:
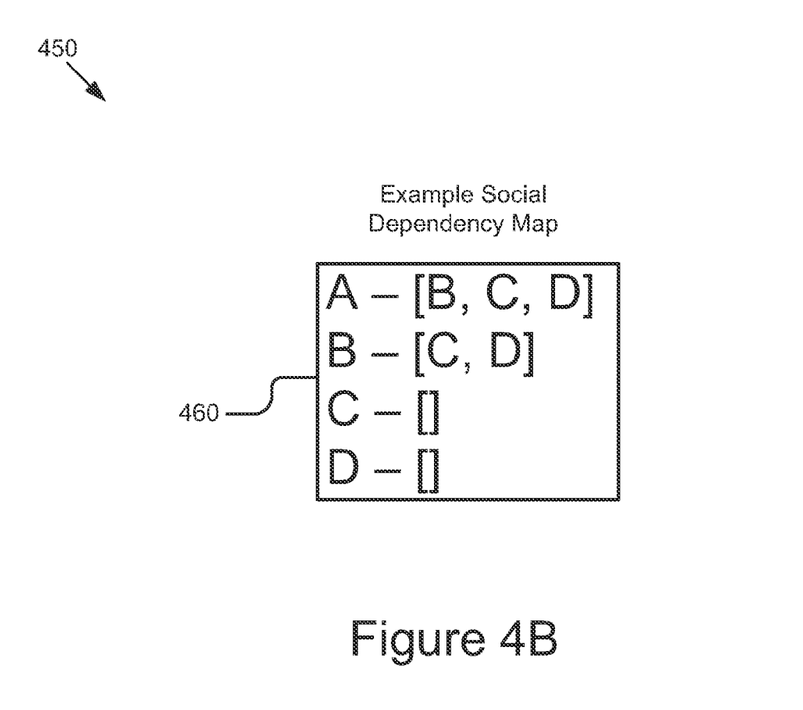
FIG. 4B is a graphical representation illustrating an example dependency map.

FIG. 4A illustrates an example method indicated by reference numeral 400 for compressing a dependency graph 410 with redundancies into a compressed dependency graph 420 (referred to as a "redundant dependency graph"). It should be understood that the order of the steps in FIGS. 4A and 4B is merely by way of example and may be performed in different orders than those that are illustrated and some steps may be excluded, and different combinations of the steps may be performed. The redundant dependency graph 410 includes example nodes A, B, C, and D. In this example, an example module A in a social network ("social module A") depends on an example module B in a social network ("social module B"), and example social module B depends on an example module C in a social network ("social module C"). Additionally, both example social module A and example social module B depend on example module D in a social network ("social module D").

The social dependency map module 305 generates a social dependency map 460 (illustrated generally by reference numeral 450 in FIG. 4B) where the dependencies of node A include nodes B, C, and D; the dependencies of node B include nodes C and D; and where nodes C and D do not have any dependencies. In the example dependency map 460, node A depends on node C, even though there is no direct dependency from node A to node C, as illustrated in the redundant dependency graph 410 (FIG. 4A).

The social dependency remover module 307 iterates through the nodes. For every node, the social dependency remover module 307 iterates through each of its dependencies. For example, node B is a dependency node of node A, and node D is a dependency of node B. Therefore, the social dependency remover module 307 removes the dependency from node A to node D, without any loss in accuracy.

Figure 5:
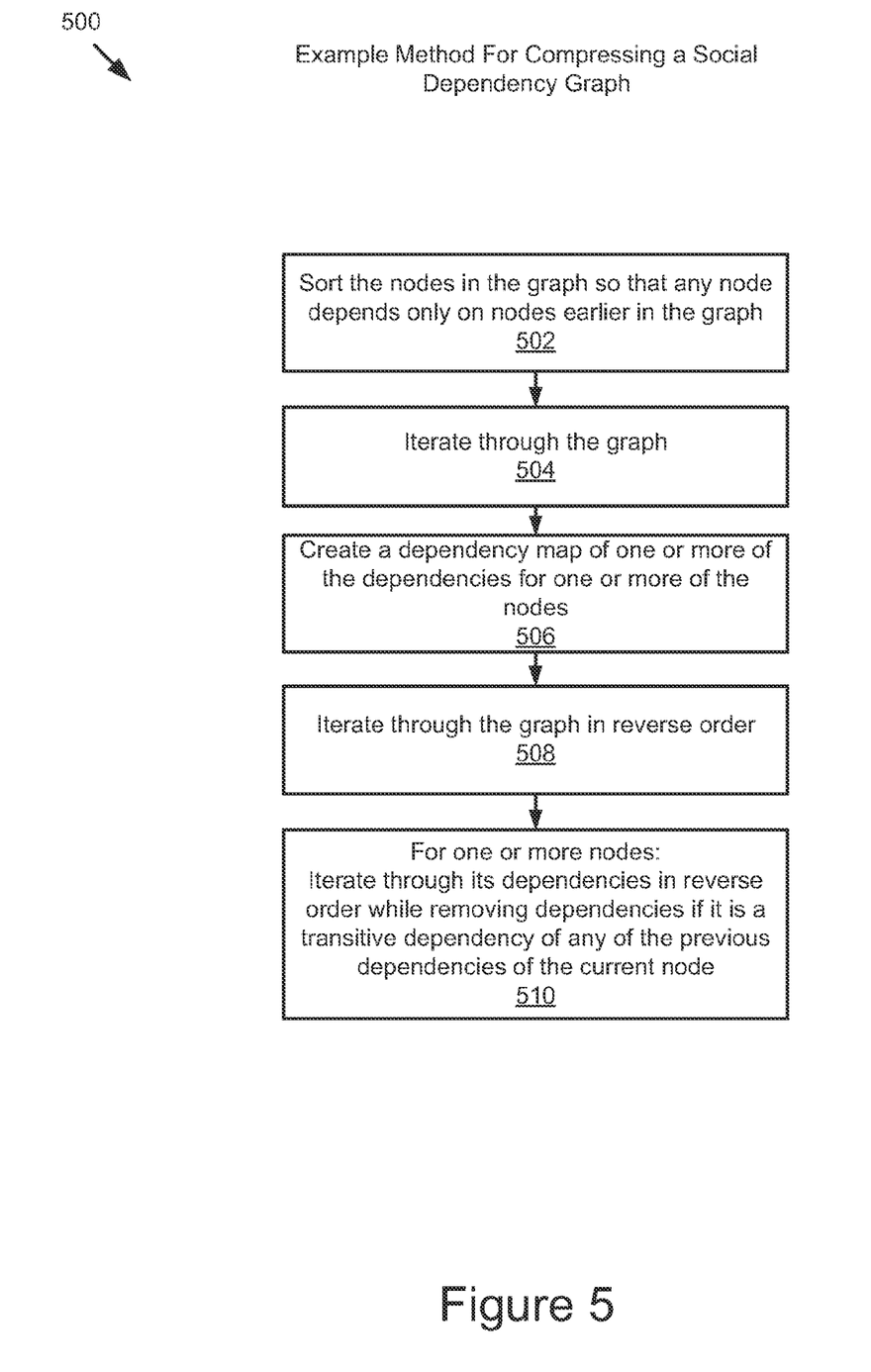
FIG. 5 is a flow chart of an example method for compressing a social dependency graph.

FIG. 5 is a flow chart illustrating an example method 500 for compressing a social dependency graph in a social network. It should be understood that the order of the steps in FIG. 5 is merely by way of example and may be performed in different orders than those that are illustrated and some steps may be excluded, and different combinations of the steps may be performed. In the method illustrated, one or more operations of the method 500 include sorting the nodes in the social dependency graph so that any node depends only on nodes earlier in the social dependency graph, as illustrated by block 502. The method 500 proceeds to the next block 504, at which stage, one or more operations of the method 500 include iterating through the dependency graph. The method 500 proceeds to the next block 506, at which point, one or more operations of the method creates a dependency map of all the dependencies for each of the nodes. The method proceeds to the next block 508, at which point, one or more operations of the method 500 includes iterating through the graph in reverse order. The method 500 proceeds to the next block 510, where, one or more operations of the method 500 include, for each node, iterating through its dependencies in reverse order, while removing dependencies if it is a transitive dependency of any of the previous dependencies of the current node under consideration.

Figure 6A:
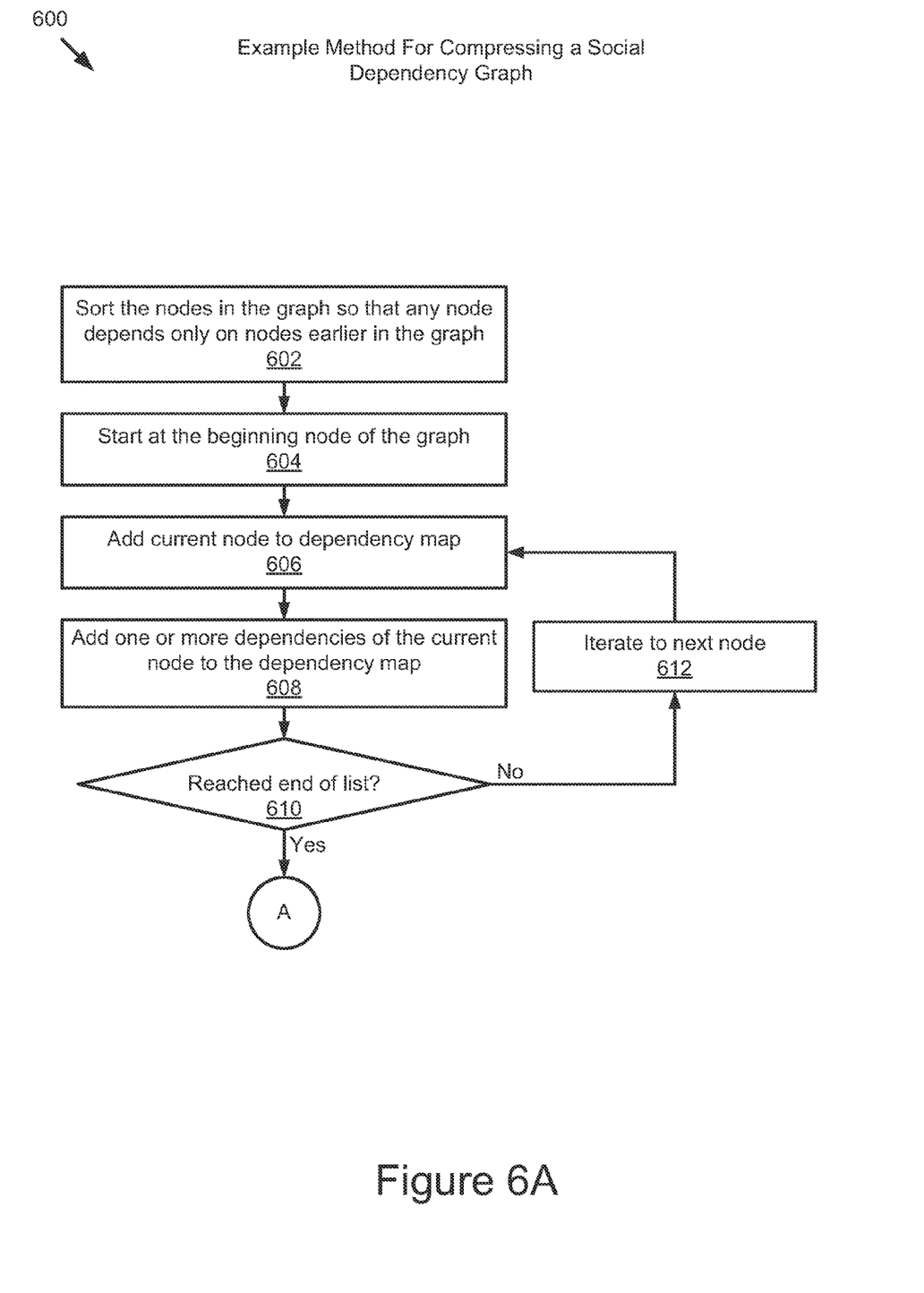
FIG. 6A is a first half of a flow chart of an example method for compressing a dependency graph.

FIG. 6A illustrates a first half of a flow chart of some example implementations of a method indicated generally by reference numeral 600 for compressing a social dependency graph. In the method illustrated, one or more operations include sorting the nodes in the graph so that any node depends only on nodes that appear earlier in the graph, as illustrated by block 602. The method 600 proceeds to the next block 604, includes starting at the beginning node of the social graph. The method 600 proceeds to the next block 606 and includes, adding the current node to the dependency map. The method 600 proceeds to the next block 608, and includes, adding all dependencies of the current node to the dependency map. The method 600 proceeds to the next block 610, where one or more operations of the method 600 include determining if the method 600 has reached the end of the list of nodes. If the method 600 has not reached the end of the list of nodes, the method 600 proceeds to block 612 and includes one or more operations to iterate to a next node in the list and proceeds back to the block 606. If the method 600 has reached the end of the list of nodes, the method 600 proceeds to block 614 (FIG. 6B), via connector "A" (in FIGS. 6A and 6B) and starts at the node at the end of the graph.

Figure 6B:
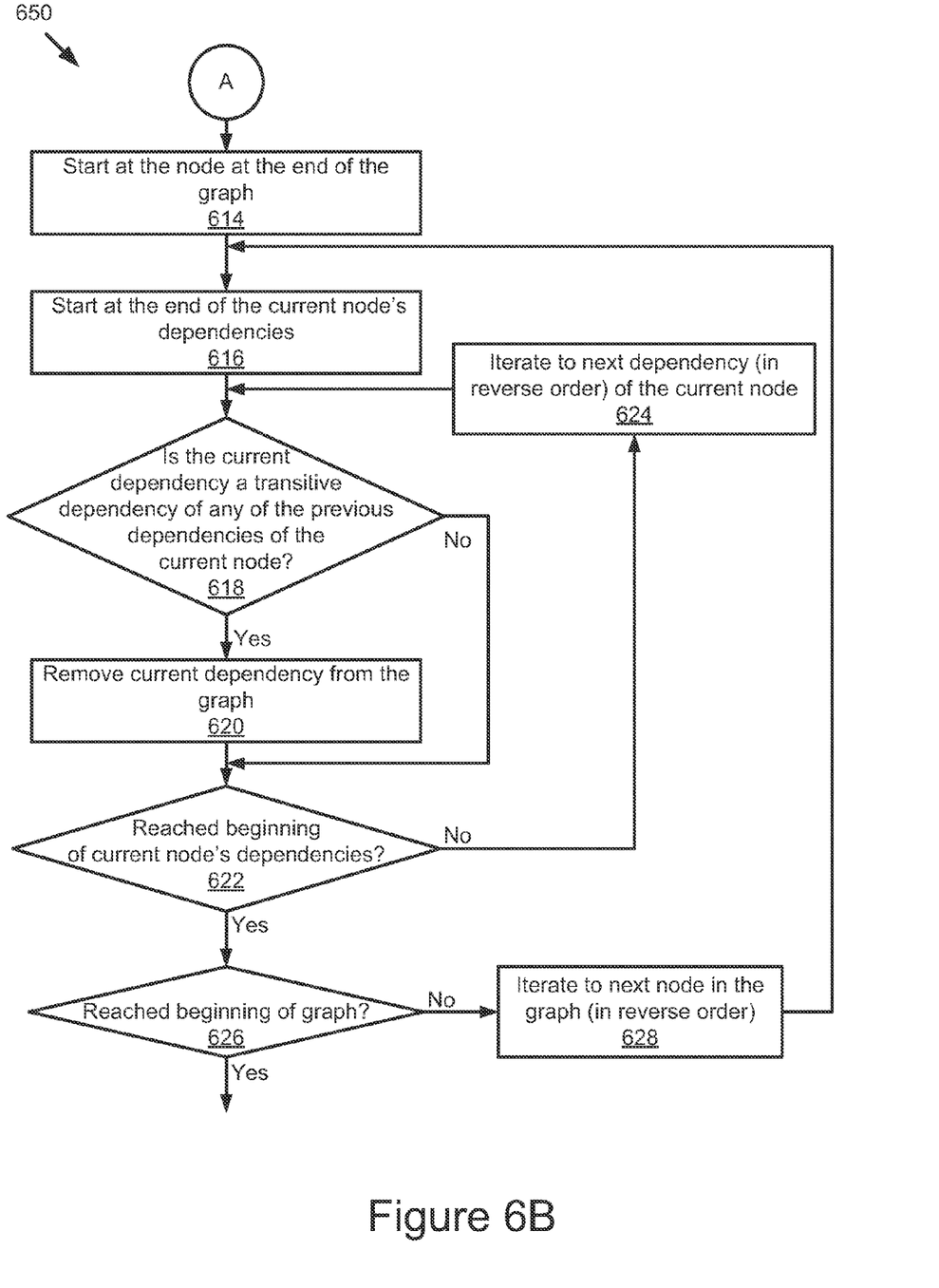
FIG. 6B is a second half of a flow chart of the example method for compressing a dependency graph.

FIG. 6B illustrates a second half of a flow chart indicated generally by reference numeral 650, to show some implementations of an example method for compressing a social dependency graph. After the method 650 proceeds to block 614, it includes one or more operations to start at the node at the end of the social graph. Next, the method 650 proceeds to the next block 616, at which point, it includes one or more operations to start at the end of the current node's dependencies. The method 650 proceeds to the next block 618, which is a decision block including one or more operations to determine if the current dependency is a transitive dependency of any of the previous dependencies of the current node. If the current dependency is a transitive dependency of any of the previous dependencies of the current node, then the method 650 proceeds to the next block 620 and includes one or more operations to remove the current dependency from the graph and proceeds to the next block 622. It should be understood that the order of the steps in FIGS. 6A and 6B is merely by way of example and may be performed in different orders than those that are illustrated and some steps may be excluded, and different combinations of the steps may be performed. If the current dependency is not a transitive dependency of any of the previous dependencies of the current node, then the method 650 proceeds directly to the next block 622 and includes one or more operations to determine if the method 650 has reached the beginning of the current node's dependencies. If the method 650 has not reached the beginning of the current node's dependencies, then the method 650 proceeds to the block 624 and includes one or more operations to iterate to the next dependency (in reverse order) of the current node, and then proceeds back to the block 618. If the method 650 has reached the beginning of the current node's dependencies, then the method 650 proceeds to block 626 at which stage, it includes one or more operations to determine if the method 650 has reached the beginning of the graph. If the method 650 has not reached the beginning of the graph, then the method 650 proceeds to the next block 628 and includes one or more operations to iterate to the next node in the graph (in reverse order) and proceed back to the block 616. The method 650 continues until it has reached the beginning of the graph (i.e., the method 650 has iterated through every node in the graph).

In the preceding description, for purposes of explanation, numerous specific details are indicated in order to provide a thorough understanding of the technology described. It should be apparent, however, that this technology may be practiced without these specific details. In other instances, structures and devices are shown in block diagram form in order to avoid obscuring the technology. For example, the present technology is described with some implementations above with reference to user interfaces and particular hardware. However, the present technology applies to any type of computing device that may receive data and commands, and any devices providing services. Moreover, the present technology is described above primarily in the context of compressing software module dependency graphs in social networks; however, the present technology may apply to compressing dependency graphs in other applications relating to social communities and may be used for other such applications beyond with just use of software modules.

Reference in the specification to "one implementation," "an implementation," or "some implementations" means simply that one or more particular features, structures, or characteristics described in connection with the one or more implementations is included in at least one or more implementations that are described. The appearances of the phrase "in one implementation" in various places in the specification are not necessarily all referring to the same implementation.

Some portions of the detailed descriptions above are presented in terms of algorithms and symbolic representations of operations on data bits within a computer memory of either one or more computing devices. These algorithmic descriptions and representations are the means used in the data processing arts to most effectively convey the substance of work to others. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware implementation, an entirely software implementation, or an implementation including both hardware and software components. In some instances, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent in the relevant art, the modules, routines, features, attributes, methodologies and other aspects of the present technology may be implemented as software, hardware, firmware, or any combination of the three. Also, wherever a component, an example of which is a module, of the present technology is implemented as software, the component may be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method for compressing a dependency graph in a social network, by replacing the dependency graph with a transitive reduction, the method comprising:
   receiving, using the one or more computing devices, the dependency graph;
   sorting, using the one or more computing devices, one or more nodes in the dependency graph, into a valid dependency ordering, wherein nodes depend on nodes that appear earlier in a list of nodes for the dependency graph;
   iterating, using the one or more computing devices, through the dependency graph in valid dependency ordering, by creating a dependency map of dependencies determined for each of the one or more nodes in the list;
   iterating, using the one or more computing devices, through the dependency graph in valid dependency ordering, for each node in the dependency graph, in reverse order, wherein the iterating in reverse order further comprises:
      starting at a last indicated dependency of an end node in the dependency map for each node in the dependency graph, and iterating, using the one or more computing devices, through the one or more dependent nodes in the dependency map to a beginning node in the dependency map, in reverse order to determine whether each single dependency of a dependent node is representative of a transitive dependency for any previous iterated dependencies, wherein a transitive dependency comprises a dependency on a node that is already dependent on another node; and
      in response to determining a transitive dependency, removing, using the one or more computing devices, the single dependency.

2. A computer-implemented method for compressing a dependency graph in a social network, the method comprising:
   receiving, using the one or more computing devices, the dependency graph;
   sorting, using the one or more computing devices, one or more nodes in the dependency graph, into a valid dependency ordering, wherein nodes depend on nodes that appear earlier in a list of nodes for the dependency graph;
   creating, using the one or more computing devices, a map from each of the one or more nodes of dependencies determined for each of the one or more nodes in the list, to iterate through the dependency graph in valid dependency ordering;

determining, using the one or more computing devices, one or more redundant dependencies for the one or more nodes in the dependency graph by iterating through the dependency graph in valid dependency ordering, for each node in the dependency graph, in reverse order, wherein the iterating in reverse order further comprises:

starting at a last indicated dependency of an end node in the dependency map for each node in the dependency graph, and iterating, using the one or more computing devices, through the one or more dependent nodes in the dependency map to a beginning node in the dependency map, in reverse order to determine whether each single dependency of a dependent node is representative of a transitive dependency for any previous iterated dependencies, wherein a transitive dependency comprises a dependency on a node that is already dependent on another node, and replacing using the one or more computing devices, the dependency graph with a transitive reduction, removing the one or more redundant dependencies.

3. A computer-implemented method according to claim 2, wherein the one or more nodes include one or more software modules.

4. A computer-implemented method according to claim 3, further comprising:
in response to loading dependencies of the one or more nodes, loading the one or more software modules.

5. A computer-implemented method according to the claim 2, wherein the computer-implemented method is configured as a graph compressor application, at least a portion of which is hosted on one or more social network servers.

6. A computer-implemented method according to claim 2, wherein the computer-implemented method is configured as a graph compressor application, at least a portion of which is hosted on one or more third party servers.

7. A computer-implemented method according to claim 2, wherein the computer-implemented method is configured as a graph compressor application, at least a portion of which is hosted on a user device.

8. A computer-implemented method according to claim 2, wherein the computer-implemented method is configured as a graph compressor application, at least a portion of which is hosted on one or more of a social network server, a third party server, and a user device.

9. A computer-implemented method implemented by readable program code encoded in a non-transitory computer-readable medium, the program code further comprising instructions for:

receiving, computing devices, the dependency graph;

sorting, using the one or more computing devices, one or more nodes in the dependency graph, into a valid dependency ordering, wherein nodes depend on nodes that appear earlier in a list of nodes for the dependency graph;

iterating, using the one or more computing devices, through the dependency graph in valid dependency ordering, by creating a dependency map of dependencies determined for each of the one or more nodes in the list;

iterating, using the one or more computing devices, through the dependency graph in valid dependency ordering, for each node in the dependency graph, in reverse order, wherein the iterating in reverse order further comprises:

starting at a last indicated dependency of an end node in the dependency map for each node in the dependency graph, and iterating, using the one or more computing devices, through the one or more dependent nodes in the dependency map to a beginning node in the dependency map, in reverse order to determine whether each single dependency of a dependent node is representative of a transitive dependency for any previous iterated dependencies, wherein a transitive dependency comprises a dependency on a node that is already dependent on another node; and in response to determining a transitive dependency, removing, using the one or more computing devices, the single dependency.

10. A computer-implemented method according to claim 9, wherein the one or more nodes include one or more software modules.

11. A computer-implemented method according to claim 9, wherein:
in response to loading dependencies of the one or more software modules, loading the one or more software modules.

12. A system, comprising:
a processor and a memory for storing instructions that cause the processor to compress a dependency graph by replacing the dependency graph with a transitive reduction, further comprising:

a graph receiver module configured to receive the dependency graph;

a sorting module configured to sort one or more nodes in the dependency graph into a valid dependency ordering, wherein nodes depend on nodes that appear earlier in a list of nodes for the dependency graph;

a dependency map module configured to iterate, through the one or more nodes in valid dependency order, by creating a dependency map of dependencies determined for each of the one or more nodes in the list; and a dependency remover module configured to iterate, through the one or more nodes, in reverse order, determining one or more redundant dependencies for the one or more nodes in the dependency graph by iterating through the dependency graph in valid dependency ordering, for each node in the dependency graph, in reverse order, wherein the iterating in reverse order further comprises starting at a last indicated dependency of an end node in the dependency map for each node in the dependency graph, and iterating through the one or more dependent nodes in the dependency map to a beginning node in the dependency map, in reverse order to determine whether each single dependency of a dependent node is representative of a transitive dependency for any previous iterated dependencies, wherein a transitive dependency comprises a dependency on a node that is already dependent on another node, and in response to a single dependency being a transitive dependency of any previous iterated dependencies, configured to remove, the single dependency.

13. A system according to claim 12, wherein the one or more nodes include one or more software modules.

14. A system according to claim 13, further comprising:
a program execution module, in response to loading dependencies of the one or more software modules, configured to execute the one or more software modules.

15. A system according to the claim 12, wherein at least a portion of the system is hosted on one or more social network servers.

16. A system according to claim 12, wherein at least a portion of the system is hosted on one or more third party servers.

17. A system according to claim 12, wherein at least a portion of the system is hosted on a user device.

18. A system according to claim 12, wherein at least a portion of the system is hosted one or more of a social network server, a third party server, and a user device.

* * * * *